United States Patent [19]

Auernhammer

[11] Patent Number: 4,553,055
[45] Date of Patent: Nov. 12, 1985

[54] COOLING ARRANGEMENT FOR AN ENCLOSED ELECTRIC MACHINE

[75] Inventor: Erich Auernhammer, Nuremberg, Fed. Rep. of Germany

[73] Assignee: Siemens Aktiengesellschaft, Munich and Berlin, Fed. Rep. of Germany

[21] Appl. No.: 621,644

[22] Filed: Jun. 18, 1984

[30] Foreign Application Priority Data

Jul. 22, 1983 [DE] Fed. Rep. of Germany ... 8321093[U]

[51] Int. Cl.[4] ............................................. H02K 9/06
[52] U.S. Cl. ...................................... 310/62; 310/59; 310/68 B; 310/114
[58] Field of Search ...................... 310/62, 63, 64, 65, 310/57, 58, 59, 114, 68 B, 60 R, 52, 112

[56] References Cited

U.S. PATENT DOCUMENTS

| | | | |
|---|---|---|---|
| 2,610,992 | 9/1952 | Johns | 310/63 |
| 3,341,113 | 9/1967 | Sebok | 310/63 |
| 3,643,119 | 2/1972 | Lukens | 310/63 |
| 3,748,507 | 7/1973 | Sieber | 310/58 |
| 4,465,948 | 8/1984 | Oyama | 310/58 |

FOREIGN PATENT DOCUMENTS

| | | | |
|---|---|---|---|
| 0653102 | 5/1931 | Fed. Rep. of Germany | 310/62 |
| 0717830 | 2/1942 | Fed. Rep. of Germany | 310/62 |
| 835476 | 3/1952 | Fed. Rep. of Germany . | |
| 1551436 | 3/1970 | Fed. Rep. of Germany . | |
| 1488561 | 7/1973 | Fed. Rep. of Germany . | |
| 0695600 | 9/1965 | Italy | 310/62 |
| 0404793 | 12/1965 | Switzerland | 310/62 |

*Primary Examiner*—R. Skudy
*Attorney, Agent, or Firm*—F. W. Powers; J. L. James

[57] ABSTRACT

The cooling arrangement for a machine provided with hollow fins has in the end regions of the stator housing ports for the internal air and below the stator housing, closed at one end by an end plate, in the region of the respective ports, a motor-driven internal fan which is laterally covered by an air deflection surface between it and the pierced inner bearing bracket. Between the inner shaft end and the motor attached to the end plate, a rotation sensor coupled with the shaft end is arranged and it is used for air conduction as well. In the fan shell a motor-driven external fan is arranged and its motor may be attached on the outer side of the end plate.

1 Claim, 2 Drawing Figures

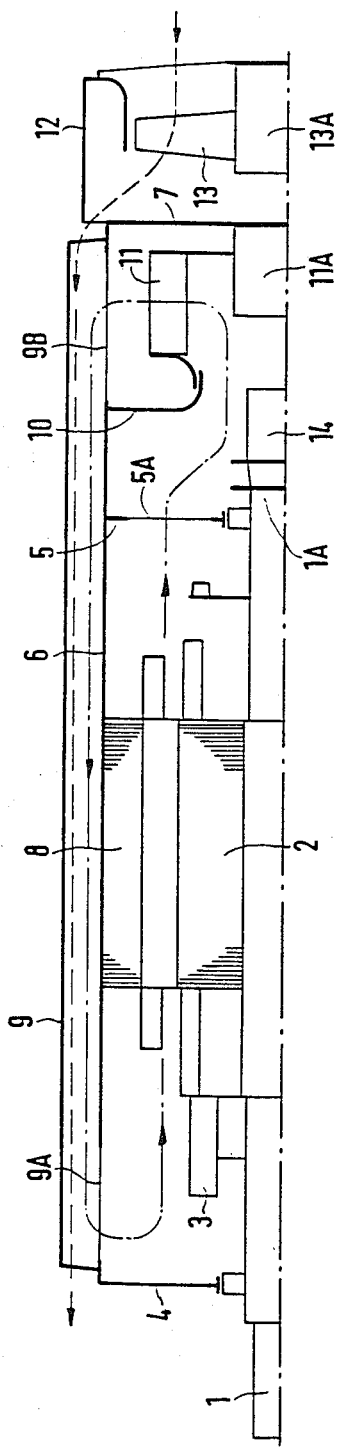
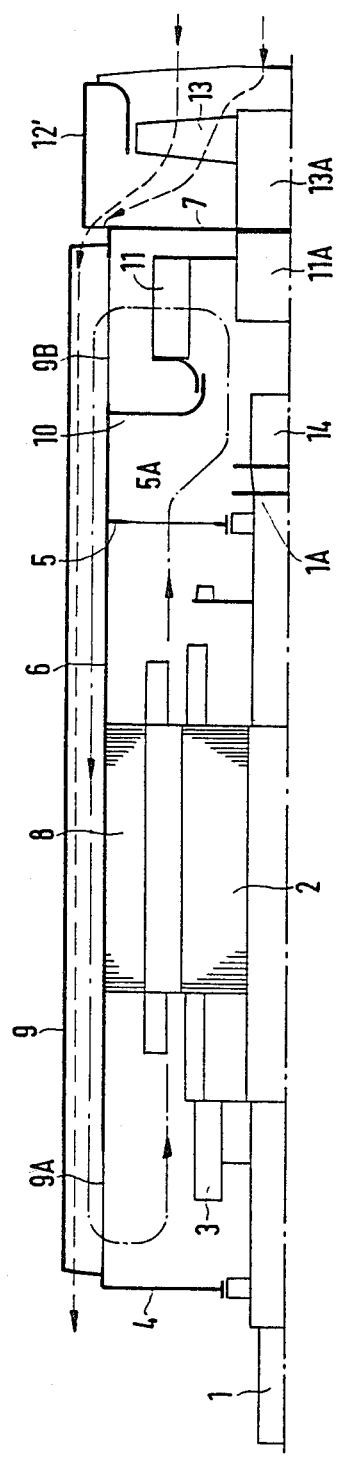

COOLING ARRANGEMENT FOR AN ENCLOSED ELECTRIC MACHINE

BACKGROUND OF THE INVENTION

The invention relates to a cooling arrangement for an enclosed electric machine having an internal fan and an external fan lodged in a fan shell.

In a typical cooling arrangement disclosed in German Pat. No. 14 88 561 the stator housing is closed by two bearing brackets. Inside the machine, behind the drive-side bearing bracket, there is arranged on the shaft an internal fan which forces the internal air to circulate through the machine and the hollow fins. The machine is then cooled by the cooling air conveyed by an external fan disposed on the other shaft end, inside a fan shell. Such a cooling arrangement is not ideal for machines which are operated at variable speeds and possibly in changing directions of rotation, because the air transport depends on the rotational speed and because fans for both directions of rotation have a lower efficiency.

Published German patent application DE-OS No. 15 51 436 discloses an installable cooling arrangement where the internal and external fans are each driven by a separate motor, to achieve an external and internal air transport independent of speed and direction. There, however, the cooling arrangement is mounted as an assembly unit on the housing of the machine, covering the bearing bracket openings thereof. This expensive cooling arrangement however, requires considerable space and is usuable only for a horizontal shaft arrangement.

A compact cooling arrangement suitable for vertical or horizontal shaft arrangement of the machine and designed as an assembly unit with independently driven interal and external fans is known from German Pat. No. 835,476, where, however, both fans are driven by a common motor, the shaft of which or the motor housing traverses under seal the carrying end plate which closes off one end face of the stator housing and the two fans of which are mounted on the motor shaft on either side of the end plate. The internal fan runs between the end plate and a bearing bracket disposed inside the circumferentially closed stator housing which has axial cooling fins and which contains the openings necessary for the internal air circulation. Through openings adjacent to the shaft the internal air is forced into the interior of the machine again between the two bearing brackets through separate openings surrounding the former. As the two fans are driven at the same speed and as the heat transfer surface for the internal air is much smaller than would be available in the case of hollow fins, optimum cooling is not obtainable also because of the common fan drive, especially since an efficient air deflection surface in the internal air circulation is missing.

SUMMARY OF THE INVENTION

It is an object of the invention to optimize a cooling arrangement for an enclosed electrical machine with an internal and external fan which operates independently of the direction of rotation and speed of the machine and which permits easy access to the internal fan or respectively simpler exchange or replacement of the cooling arrangement.

In general, the invention features a cooling arrangement for an enclosed electric machine with an internal fan and with an external fan lodged in a fan shell disposed in front of the end face of the end plate, the external fan blowing the cooling air between the hollow fins traversed by internal air, the hollow fins being applied axially on the circumference of the stator housing which is closed on the drive side by a bearing bracket and communicating through ports in both end regions of the stator housing with the interior of the machine, there being provided, between the ports adjacent to the external fan and the stator, an air deflection surface which closely hugs and is supported by the stator housing on the circumferential side and extends crosswise to the shaft with concentric spacing, wherein the second bearing bracket disposed inside of and supported by the stator housing between the stator and the air deflection surface on the stator housing has openings for the internal air, and the stator housing is releasably closed by an end plate on which internally a motor for the internal fan is mounted which, ready for operation, in spaced relation surrounded by the correlated ports borders laterally on the air deflection surface, and between the motor and the internal end of the shaft a rotation sensor coupled with the latter is disposed in the internal air stream, and in the fan shell a motor-driven external fan is disposed.

In preferred embodiments of the cooling arrangement the motor of the external fan is fastened to the outer side of the end plate, and the end plate forms an assembly unit with two fan arrangements and a fan shell.

Since the two fans are driven by separate motors, an optimum speed can be selected for each fan in accordance with the respective fan size. Advantageously both fan motors may be attached to the cover, so that the fan shell may be of simple, light-weight and especially flow-efficient design, since both fans are carried by the end plate. After removal of the fan shell, the end plate can be removed from the stator housing together with the internal fan or respectively with both fans.

The invention is intended in particular for pole-reversible and direction-reversible machine or for rotation-reversible electric machines otherwise controllable in their rotational speed, such as sugar centrifugal motors.

Other features and advantages of the present invention will become apparent from the following detailed description, and from the claims.

For a full understanding of the present invention, reference should not be made to the following detailed description and to the accompanying drawings.

BRIEF DESCRIPTION OF THE DRAWINGS

Two embodiments of the invention are illustrated in the following drawings in half longitudinal section, greatly simplified, and intended for a commutator machine:

FIG. 1 shows a machine with the internal air motor on the inner side of the end plate; and FIG. 2 shows a machine with fan motors on both sides of the end plate.

DETAILED DESCRIPTION

Shaft 1 with rotor 2 and commutator 3 is mounted, according to FIG. 1, on bearing bracket 4 closed on the drive side and in a second bearing bracket 5 provided with openings 5A connected to and is disposed inside stator housing 6 which projects a sufficient distance over the other shaft end and is releasably closed with end plate end face 7. Stator housing 6 encloses stator 8 of the machine and is firmly connected on its outer side with axial hollow fins 9 closed on the end face. These fins extend over the full length of stator housing 6. In each end zone of stator housing 6, in the region of hollow fins 9, ports 9A, 9B are provided for the internal air. Ports 9A are arranged between bearing bracket 4 and stator 8, and ports 9B between end plate 7 and an air deflection surface 10 concentrically spaced from the shaft, which surface is limited on one side, is supported by, and closely hugs stator housing 6 contiguous to internal fan 11.

By its fan motor 11A, internal fan 11 is fastened to the inner side of end plate 7, which in turn is releasably mounted on the end face of the stator housing, closing the latter. In front of end plate 7, a fan shell 12 with external fan 13 and fan motor 13A is releasably arranged in spaced relation in a conventional manner. This fan shell then guides the cooling air stream on the circumference toward the interstices between hollow fins 9 according to the broken arrow line. The internal air flows axially through the interior of the machine and through the hollow fins in the arrow direction indicated in dash-dot lines.

As both fans are always operated in one direction of rotation by their motors independently of the direction of rotation of the machine, flow-efficient internal and external fans which deliver optimum air quantities at the best suitable rotational speed can be used, and separately adapted to the particular transport and flow conditions for the internal air and the cooling air.

An especially simple fan shell 12' for optimum flow is possible if the two fan motors 11A and 13A are attached on both sides of end plate 7, as is indicated in a simplified form in FIG. 2.

In both of the above-mentioned cases there is provided with the inner shaft end 1A between it and the motor 11A inside the air deflection surface 10, a typical rotation sensor 14 which picks up the rotational speed and direction of rotation and which influences a control device of the machine (not shown) and/or controls an indicator. The rotation sensor is coupled to the shaft end 1A and lies in the internal air stream and may be designed for internal air supply to the internal fan.

There has thus been shown and described a novel cooling arrangement for an enclosed electric machine which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a cooling arrangement for an enclosed electric machine having a shaft on one end and an end plate end face on the other with an internal fan and with an external fan lodged in a fan shell disposed in front of the end plate end face, the external fan blowing the cooling air between the hollow fins traversed by internal air, said hollow fins being applied axially on the circumference of a stator housing which is closed on the drive side by a first bearing bracket and communicating through ports in both end regions of the stator housing with the interior of the machine, there being provided, between the ports adjacent to the external fan and a stator, an air deflection surface which closely hugs and is supported by the stator housing on the circumferential side and extends crosswise to the shaft with concentric spacing, the improvement wherein a second bearing bracket, connected to and disposed inside of the stator housing between the stator and the air deflection surface on the stator housing, has openings for the internal air, and the stator housing is releasably closed by the end plate end face on which internally a motor for the internal fan is mounted which in spaced relation surrounded by correlated ports borders laterally on the air deflection surface, and between the motor and internal end of the shaft; a rotation sensor coupled with the latter is disposed in the internal air stream and a fan shell having a motor-driven external fan is releasably engaged to the front of the end plate end face.

* * * * *